(12) United States Patent
Campbell (10) Patent No.: US 8,666,155 B2
(45) Date of Patent: Mar. 4, 2014

(54) METHOD AND SYSTEM FOR GRAY CONTENT DETECTION IN OUTPUT DOCUMENTS FOR BILLING DETERMINATIONS

(75) Inventor: James B. Campbell, Beaverton, OR (US)

(73) Assignee: Xerox Corporation, Norwalk, CT (US)

( * ) Notice: Subject to any disclaimer, the term of this patent is extended or adjusted under 35 U.S.C. 154(b) by 80 days.

(21) Appl. No.: 13/528,424

(22) Filed: Jun. 20, 2012

(65) Prior Publication Data

US 2013/0343644 A1 Dec. 26, 2013

(51) Int. Cl.
G06K 9/00 (2006.01)

(52) U.S. Cl.
USPC ........... 382/162; 382/164; 382/165; 382/170; 358/515

(58) Field of Classification Search
USPC ................. 382/162, 164, 165, 169, 170, 278; 358/515, 538
See application file for complete search history.

(56) References Cited

U.S. PATENT DOCUMENTS

| | | | |
|---|---|---|---|
| 6,844,937 B2 | 1/2005 | Dempsey et al. | |
| 6,880,124 B1 * | 4/2005 | Moore | 715/210 |
| 7,004,382 B2 * | 2/2006 | Sandru | 235/379 |
| 7,755,800 B2 | 7/2010 | Malik et al. | |
| 7,903,285 B2 | 3/2011 | Malik et al. | |
| 8,019,755 B2 * | 9/2011 | Hillary et al. | 707/728 |
| 8,059,858 B2 * | 11/2011 | Brundage et al. | 382/100 |
| 8,117,134 B2 | 2/2012 | Campbell et al. | |
| 8,150,736 B2 * | 4/2012 | Horn et al. | 705/26.1 |
| 2010/0088201 A1 | 4/2010 | Nagarajan et al. | |
| 2010/0280929 A1 | 11/2010 | Coffey et al. | |
| 2012/0143736 A1 | 6/2012 | Li | |

OTHER PUBLICATIONS

U.S. Appl. No. 13/335,387, filed Dec. 22, 2011, Amal Z. Malik

* cited by examiner

*Primary Examiner* — Yosef Kassa
(74) *Attorney, Agent, or Firm* — Pillsbury Winthrop Shaw Pittman, LLP (57) ABSTRACT

A method and system implementing the method for color pixel counting in images by determining color pixels that, upon marking, appear as visibly color or gray to the human eye by applying a 2-dimensional filter and a reverse color lookup process. An area color computation is performed on a window around each pixel of interest to determine average gray level values for output colors (C, M, Y). Gray line values for each output color are determined and the values for at least two output colors are compared to the average gray level values. If average gray level value for both colors is within a tolerance for the gray line, the pixel is determined as visibly gray. Otherwise, if at least one count is not within the tolerance, the pixel is determined as visibly color. The count of visibly color pixels can be used to determine the billable color pixel count.

25 Claims, 4 Drawing Sheets

METHOD AND SYSTEM FOR GRAY CONTENT DETECTION IN OUTPUT DOCUMENTS FOR BILLING DETERMINATIONS

BACKGROUND

1. Field

The present disclosure is generally related to color and gray content detection in image data so that a billing structure for outputting documents is determined.

2. Description of Related Art

Image data comprises a number of pixels having a number of components that contribute to defining the image, such as color and intensity. The image data generally includes various color or gray levels, which contribute to the intensity of each pixel in the image. Each pixel of the image is assigned a number representing the amount of light or gray level for that space at that particular spot; i.e., the shade of gray in the pixel. Binary image data has two possible values for each pixel, ON (represented by the number "1") or OFF (represented by the number "0"). Images that have a large range of shades are referred to as grayscale images. For example, grayscale images have an 8-bit value per pixel comprising 256 tones or shades of gray for each pixel in the image (gray level of 0 to 255). Grayscale image data may also be referred to as continuous tone or contone image data. The pixels in a color image may be defined in terms of a color space, typically with a number of values or planes, such as three (e.g. RGB, CIELab) or four (e.g., CMYK—C for cyan, M for magenta, Y for yellow, and K for black).

When outputting image data to an output device (e.g., copier, printer, or multi-function device (MFD)), a percentage scale may be used to identify how much ink is employed for a print job. Such information may typically be used for billing a customer for print jobs. For example, some methods employ a billing strategy based on an estimated amount of ink or toner consumption; others bill customers based on a print mode selection (e.g., draft, standard, color, enhanced, etc.) of the output device. In dynamic print job environments, because printing using black ink or toner is less expensive than using colored ink or toner, billing is often based on the amount of color content contained in the job to be printed. In order to bill customers for color printing, color detection is an important feature required in an image path. Color detection is used to analyze documents for presence of color as well as an amount of color in order to bill customers accordingly. Generally, the higher the presence and amount of color in a document, the higher the cost.

Although pixels in the hardware on the binary output at the back end of the image path can be counted, without knowledge of the user specified color versus gray, or device gray line, the gray content of the original image data can not necessarily be determined. For example, when a PDL interpreter and the copy image path generate a balanced gray using composite gray, then backend pixel counters cannot distinguish intended gray from marked color.

Some systems include counting the number of pixels in the image data of the document to be printed. For example, a number of binary pixels associated with the CMYK color planes may be counted to determine a pixel count for each category of color at the time of marking for output in the image path. Generally, with existing color detection and counting methods, a pixel will be labeled as color when the presence of any one of the C, M, and Y signals is detected. U.S. Pat. No. 8,117,134, filed Oct. 16, 2008 by the same Assignee (Xerox Corporation), which is hereby incorporated by reference in its entirety, proposes a way to count color pixels. Other alternate methods for determining color coverage on a marked page include counting pure black pixels marked on the page separately from the CMY pixels and providing separate paths for the counters. For example, RGB input can be detected and K generated. The K is then passed onto the backend where it is converted to gray balanced CMY.

In solid ink and ink jet products, however, neutral areas of an image are often rendered neutral with a combination of cyan, magenta, yellow, black (CMYK) toner/ink when printing or copying. For example, when separate paths for counters are used, CMYK color commands are limited to the RIP generated composite K, and thus the backend counters will count rendered gray or neutral pixels as color. This can create problems in billing based strictly on marking pixel counts since these "gray" counts may be composed of color toners that mimic gray but are counted towards color. For billing purposes, it is not desirable to charge customer for color pixels that were (are) supposed to be gray. The above-referenced '134 patent, for example, has limitations in handling binary image data.

For copy path images, the C, M, and Y values of a pixel in a composite gray area could be quite different. In such images, many of these pixels can be labeled as color (they may be rendered neutral gray), and thus counted as color pixels, which therefore skews the results used to determine the bill for outputting the document. In a multi-tier billing system, for example, pages/documents are placed into different tiers based on the amount of color content therein. Therefore, the customer may be billed for printing the document at a higher rate even though the output document reflects color pixels that are neutralized or gray. Customers do not wish to be billed for composite gray items or neutral pages if the color is not visible to the human eye on the output document.

Furthermore, other systems are configured to generate gray balanced CMY (to depict black pixels, or composite K) and no pure K, and thus the composite K pixels cannot be separated from the color pixels during the determination and accounting of bills for outputting and marking documents. The copy path does the same.

Accordingly, an improved system and method of determining the amount of visible color content in a marked and output document to more accurately bill customers is desirable.

SUMMARY

One aspect of this disclosure provides a processor-implemented method for color pixel counting in documents for billing having at least one page of image data using an image processing apparatus. The image processing apparatus has at least one processor for processing documents containing image data having a plurality of pixels. The method includes the following acts implemented by the at least one processor:

receiving image data of a document having a plurality of pixels;

determining a billable count of color pixels in the received image data by determining if color pixels from the received image data are visibly color or composite gray to the human eye upon marking using one or more output color components by processing pixels of interest, and, for each pixel of interest:

establishing a window in the image data including the pixel of interest and neighboring pixels around the pixel of interest;

performing an area color computation of the window to determine an average gray level value for each output color component for the pixels in the window;

determining gray line values for the output color components at which they appear visibly gray to the human eye when marked;

comparing the average gray level value from the area color computation for at least two output color components to corresponding gray line values, and, wherein the comparing determines that the pixel of interest is visibly color or composite gray upon marking.

Another aspect of this disclosure provides a system for color pixel counting in documents for billing having at least one page of image data using an image processing apparatus. The system includes: at least one processor having an input and an output associated with the image processing apparatus for processing the pixels of the image data, wherein the at least one processor is configured to: receive image data of a document having a plurality of pixels; determine a billable count of color pixels in the received image data by determining if color pixels from the received image data are visibly color or composite gray to the human eye upon marking using one or more output color components by processing pixels of interest, and, for each pixel of interest:

establish a window in the image data including the pixel of interest and neighboring pixels around the pixel of interest;

perform an area color computation of the window to determine average gray level values for each output color component for the pixels in the window;

determine gray line values for the output color components at which they appear visibly gray to the human eye when marked;

compare the average gray level values from the area color computation for at least two output color components to the corresponding gray line values, and, wherein the comparison determines that the pixel of interest is visibly color or composite gray upon marking.

Yet another aspect of this disclosure includes a non-transitory computer readable medium including instructions that, when executed by a computer, directs a computer to perform a method for color pixel counting in documents for billing using an image processing apparatus. The method includes:

determining a billable count of color pixels in image data of a document by determining if color pixels from the image data are visibly color or composite gray to the human eye upon marking using one or more output color components by processing pixels of interest, and, for each pixel of interest:

establishing a window in the image data including the pixel of interest and neighboring pixels around the pixel of interest;

performing an area color computation of the window to determine average gray level values for each output color component for the pixels in the window;

determining gray line values for the output color components at which they appear visibly gray to the human eye when marked;

comparing the average gray level values from the area color computation for at least two output color components to the corresponding gray line values, and, wherein the comparing determines that the pixel of interest is visibly color or composite gray upon marking.

Other features and advantages of the present disclosure will become apparent from the following detailed description, the accompanying drawings, and the appended claims.

DETAILED DESCRIPTION OF THE PREFERRED EMBODIMENT(S)

This disclosure uses algorithms, methods, and processing elements (e.g., hardware) in multi-function systems/devices to determine visible color pixels and a billing structure for those visible color pixels taking the above problems (e.g., overcharging for color documents that are not visibly colorful and billing for rendered neutral or composite gray pixels) into consideration.

The disclosed composite-gray detection method can be implemented in all image path configurations in an MFD or other output marking device, including copy and printing paths. This allows for content that is gray or rendered gray—according to the human eye—when output and marked to be billed based on lower rates, e.g., lower billing tiers, such as those that are used for billing for marking black and white image data. As explained in further detail below, a pixel of interest is determined as composite gray (or color) by estimating the local color(s) and values around the pixel, and using a reverse color look-up table to determine if the pixel of interest is composite gray. In an embodiment, the pixel is determined to be composite gray if it is within a specified tolerance.

Throughout this disclosure, visibly gray (or neutral) and visibly color (non-neutral) pixels are used as elements for determining billing structures or costs (e.g., from tiers). The term "pixel" as used herein is defined as an element of data that may be provided in any format, color space, or compression state which is associated with or readily convertible into data that can be associated with a small area or spot in an image that is printed or displayed. Generally, a pixel is defined in terms of value (or brightness or intensity) and its position in an image. A pixel may be associated with an array of other small areas or spots within an image, including a portion of an image, such as a color separation plane. An image generally comprises a plurality of pixels having a number of components that contribute to defining the image when it is either printed or displayed.

The term "non-neutral" or "color" pixel as used herein is defined as a pixel that comprises at least one visible color from a color set of output color components (e.g., when output or marked) to the human eye. Output color components are defined as colors of medium that are used for marking, e.g., solid ink. One or more color component can be used to mark a pixel on a page. For example, a color pixel may comprise one or more output color components such as cyan ("C"), magenta ("M"), and/or yellow ("Y"). Generally, pixels have an 8-bit value comprising 256 tones or shades of gray for each pixel in the image, i.e., a gray level of 0 to 255.

The terms "gray," "composite gray" and/or "neutral pixel" as used interchangeably herein are defined as a pixel that appears black (e.g., when output or marked) or rendered gray or neutral during processing to the human eye, such when using as black ("K") colorant or a combination of colors (C, M, Y) and/or black to form composite black (formed from a combination of "CMYK") or grayed pixel. For example, pixels, when output on a document, may be rendered gray using black/composite black ink or toner, or rendered gray by applying another color component or two therewith.

Threshold values may be used to determine if a pixel is identified as a visibly gray pixel or a visibly color pixel. Moreover, such values at which each color component appears visually gray to the human eye, either alone or in combination with one or more other color components, may be pre-determined. In this disclosure, such values are called a "gray line value" for a component. The gray line values for the output color components being visibly gray may be based on gray line determinations selected by a user (e.g., based on a selected color match or input/output settings of a system), for a particular output device (known as device gray line), or both. The gray line values may be selected or predetermined for the particular output device being used (e.g., schematically shown in FIG. 2).

The color spaces or color planes as used herein that are associated with device independent image data, device dependent image data, binary image data, and/or contone image data should not be limiting. For example, in an embodiment, device independent image data may be in L*a*b or sRGB space. Similarly, for example, in an embodiment, device dependent image data may be in CMYK space.

As discussed above, a direct counting method fails to consider pixels that are visibly rendered gray or neutral to the human eye when output on a page. Counting using separate image paths also fails to provide accurate results. Moreover, prior art devices that do not implement or mark with pure black (K) ink can not accurately distinguish between color and neutralized pixels.

This disclosure proposes an improved way of counting color pixels that are visible to the human eye when marked/output, so that pixels that are rendered neutral or composite gray when output are not counted as color when determining a billing structure for a customer or a user. Although there are exemplary embodiments described herein, it is to be understood that such embodiments are not meant to be limiting.

In order to reduce or prevent potential billing problems with regards to billing customers for color pixels that do not visually appear to the human eye to contain color, this disclosure provides a method for counting color pixels and/or composite gray/rendered black pixels, which are used for determining at least a determined billable count of color pixels the image data in the output document/page that appear visibly as color to the human eye. This count of color pixels is used to determine a billing structure or tier at which to bill for outputting documents. Generally, a billing structure is a method by which a charge to a user or customer for printing a document is calculated. A billing structure may be a calculation method associated with or correlated with tiers, thresholds, values, or algorithms, for example. Further details regarding tiered billing structures are discussed below with reference to blocks 402-412 in FIG. 4.

In the described example embodiments, the executed billing plans are designed to bill for color content (text, objects, areas) that only appears to be color to the human eye when output, and thus exclude the rendered neutral, composite gray, or gray pixels (and/or objects, neighborhoods, or areas of those pixels) that do not appear as color when determine the billable count of color pixels for a document (or page). The exemplary embodiments herein are described with reference to non-neutral or color (C, M, Y) pixels and composite gray (neutral) pixels. However, the billing structure or costs are configured to be determined without including types of rendered neutral or gray pixels in the billable count (but should not be limiting). The actual color of the pixel (or combination of colors, e.g., in a neighborhood, window, or area) is used directly and indirectly to determine the billable count of color pixels (and thus the selected billing structure).

Figure 1:
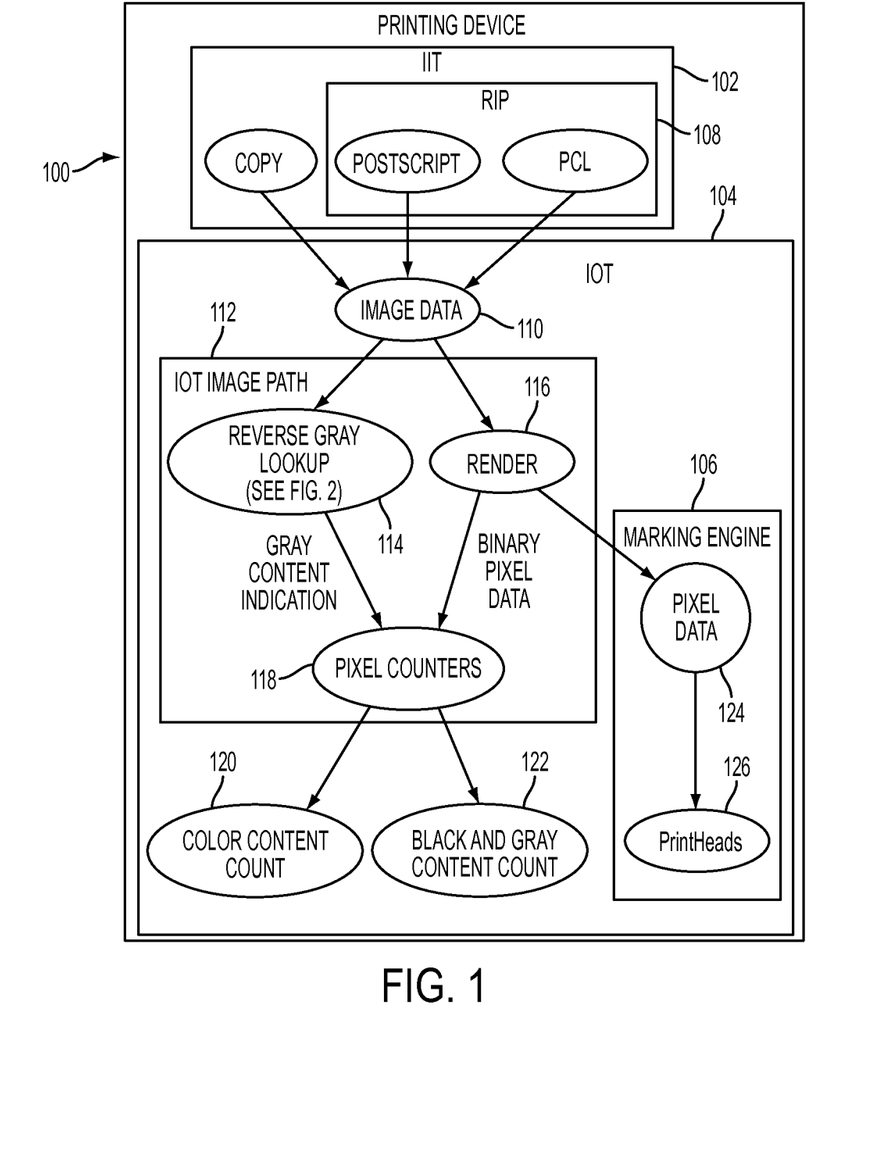
FIG. 1 shows a schematic diagram of a system with image paths for color pixel processing and counting and outputting documents in accordance with an embodiment of the present disclosure.

Referring now more particularly to the drawings, FIG. 1 shows a schematic diagram of a system 100 in the form of a printing device, in accordance with an embodiment. The system 100 can be an image processing apparatus, such as an MFD, or associated with an image processing apparatus. The system 100 comprises, among other devices, an input device or image input terminal (e.g., IIT or memory) 102 and an output device or image output terminal (e.g., IOT) 104. IOT 104 may include a processor or processing elements, a memory and/or a storage device, as well as a marking engine 106. Generally, the above elements (as will be described) of the device are provided to perform functions that assist in receiving image data such as a scanned document, configuring the image path to process the image data, and, if needed, outputting the image data such as by printing a document according to an output mode that may be selected. However, it should be noted that the apparatus or device may comprise additional elements or modules not described herein or alternative elements for performing similar or other functions (e.g., cost calculations), and should not be limited to those elements as illustrated in FIG. 1.

In some embodiments, the input device 102 is used to scan or acquire an input document or page into image data, such as when copying a document, for example. The input device 102 may be a digital scanner, for example. Generally, however, any device used to scan or capture the image data of a document for an image processing apparatus may be used. For example, the image data may be captured by a scanner in a copier, a facsimile machine, a multi-function device, a camera, a video camera, or any other known or later device that is capable of scanning a document and capturing and/or inputting electronic image data. The input device 102 may include submission of electronic data by any means and should not be limiting. In other embodiments, the input device 102 may be an electronic device for inputting electronic image data. In some embodiments, input device 102 may be connected to a network or telephone system, for example, to receive as input image data such as via a facsimile (fax) machine or computer (CPU). Input documents and/or image data that is received electronically may be received via a telephone number, an e-mail address, an Internet Protocol (IP) address, a server, or other methods for sending and/or receiving electronic image data. The network may be a digital network such as a local area network (LAN), a wide area network (WAN), the Internet or Internet Protocol (IP) network, broadband networks (e.g., PSTN with broadband technology), DSL, Voice Over IP, WiFi network, or other networks or systems, or a combination of networks and/or systems, for example, and should not be limited to those mentioned above.

The input device 102 is used to deliver image data of a document to processing elements, or "processors," in the image path (not all shown). That is, one or more processors or processing elements for processing and/or manipulating image data using a plurality of operations and/or processes may also be included in system 100 and may be provided along the image path 300. Additionally and/or alternatively, additional operations may be performed on the image data other than or in addition to those described herein.

The image path(s) of system 100 may comprise one or a plurality of image processing elements (or processor(s)) for manipulating image data received from the input device 102 using a plurality of operations and/or processes. The processing elements may be a combination of image processing elements which comprise software and hardware elements that perform a number of operations on the image data received from the input device 102 (e.g., IIT/scanner, memory, or other source) using a set of parameters. The parameters are used to convert the images to the format desired as output (e.g., high quality) along the image path. The processing elements may be a part of a computer system, device, or apparatus such as a xerographic system, a photocopier, a printing device, or a multi-function device (MFD). The terms "processing element" or "processor" are used interchangeably throughout this disclosure and refer to one or more elements capable of executing machine executable program instructions. It is to be understood that any number of processing elements may be used alone, in combination with other processors, and/or in combination with other devices and that additional and/or alternative operations or processes besides those described below may be provided in an image path. Devices that are configured to receive and process data, such as digital electronics, may be used for implementing any of the method steps and/or functions in the image path.

In an embodiment, the processes of the image path can be implemented using digital electronics, such as hardware in the form of an FPGA or ASIC. For example, the FPGA can be loaded using software from a disk or storage device.

Also, a memory and/or storage device may be provided with system 100. Memory and/or storage may be used to store machine readable instructions to be executed by the processor/processing elements. The memory and/or storage may be implemented using static or dynamic RAM (random access memory), a floppy disk and disk drive, a writable optical disk and disk drive, a hard disk and disk drive, flash memory, or the like, and may be distributed among separate memory components. The memory and/or storage can also include read only memory, or other removable storage drive(s) or memory devices.

Once received image data is processed in the image path (e.g., using front end processing element(s)), it can be compressed, for example, and may be stored in memory and/or storage temporarily or for a later time when needed, e.g., when marking. When the image data is needed or it is time for marking (e.g., using the marking engine 106 of an associated output device, the image data may be retrieved from memory and/or storage, e.g., via the back end processing element(s) or obtained directly from the input device 102, as shown at 110. In the output image path, the image data can be further processed by determining a billable pixel count using a reverse gray lookup process (with a look up table, or LUT), shown at 114, 118, 120, and 122, and by rendering the image data at 116 such that the binary pixel data can be sent to the marking engine 106 for marking Specifically, back end processing element(s) in the IOT image path 112 receive processed image data for output. Back end processing element (s) 310 may be used to further render the image data for output, as indicated at 116 in FIG. 1. For example, back end processing element(s) may be used to convert the color space of the processed image data (e.g., convert from device independent CIE L*a*b color space to device dependent, binary CMYK color space), provide color balance, further rendering, filtering, and/or other operations or processes. Subsequently, back end processing element(s) may be used to decompress the image data and output the image data via marking engine 106. The output of processed image data from the back end processing element(s) depends on the image path (or output mode). The back end processing element(s) may be used for gray content detection in the image data by, for example, implementing a method employing two dimensional image data filtering combined with reverse color lookup with tolerance for gray line detection, shown at 114 and further described with reference to FIG. 2. This includes performing an area color computation of windows of image data around pixels of interest (shown and described with reference to FIG. 3), determine gray level value for output color components at which they appear visibly gray, and comparisons to determine which pixels of the image data should be counted as color in the color content count 120 by pixel counters 118, and which pixels should be counted as black/gray content count 122 by pixel counters 118.

Once the binary pixel data is rendered, the processed image data may be directly output to the marking engine 106 for printing. The marking engine 106 may be associated with any type of output device. In embodiments, the marking engine 106 and/or output device is integrated into system 100. The marking engine 106 may be associated with a printer, a copier, or an MFD which is used for printing documents, or incorporated therein. For example, as shown in FIG. 1, the marking engine 106 can send the processed pixel data 124 to print heads 126 (e.g., of an ink jet device) which mark page(s) with the output color components to complete a copy or print job. Alternatively, the marking engine can send processed pixel data 124 to an electrostatic printing device. The type of marking system and/or the type of marking material (e.g., ink, powder, or toner) of the output device used for marking and/or outputting the processed pixel data onto one or more page(s) is not limiting. Also, the marking engine 106 may further perform image processing on the image data to make corrections or compensate for deviation in the printing process. Alternatively, the back end processing element(s) may be used to perform further image processing on the image data.

The type of output device the marking engine 106 is associated with should not be limiting. For example, the output device may comprise an image output terminal (IOT), display, screen, printing device, copying device, MFD, or others devices, as generally noted above. The display or screen may be a part of a computer (CPU) or user interface (UI) or may be provided to relay information from a website or other device via a network, for example. In some cases, a UI may be provided directly on the apparatus/device, while in others a UI is provided as a separate electronic device.

It should be noted that the output print quality of image data from an output device such as an MFD may depend the type of system or device (and its available output modes/resolution). In some cases, multiple print quality modes (PostScript driver), each with a different resolution, are supported.

In an embodiment, one or more of the elements of system 100 may be connected to a network or telephone system, for example, for communication with other devices, systems, or apparatuses. For example, in some cases, image data or executable instructions may be provided via a computer (CPU) connected to the network. A billing system may be provided via the network, for example.

Each of the image processing elements comprises an input and an output. Additionally, the system, device, or apparatus may also include one or more controllers or routers (not shown) to select and route the image data between the processing elements, IIT, IOT, and other elements or modules, for example.

Figure 2:
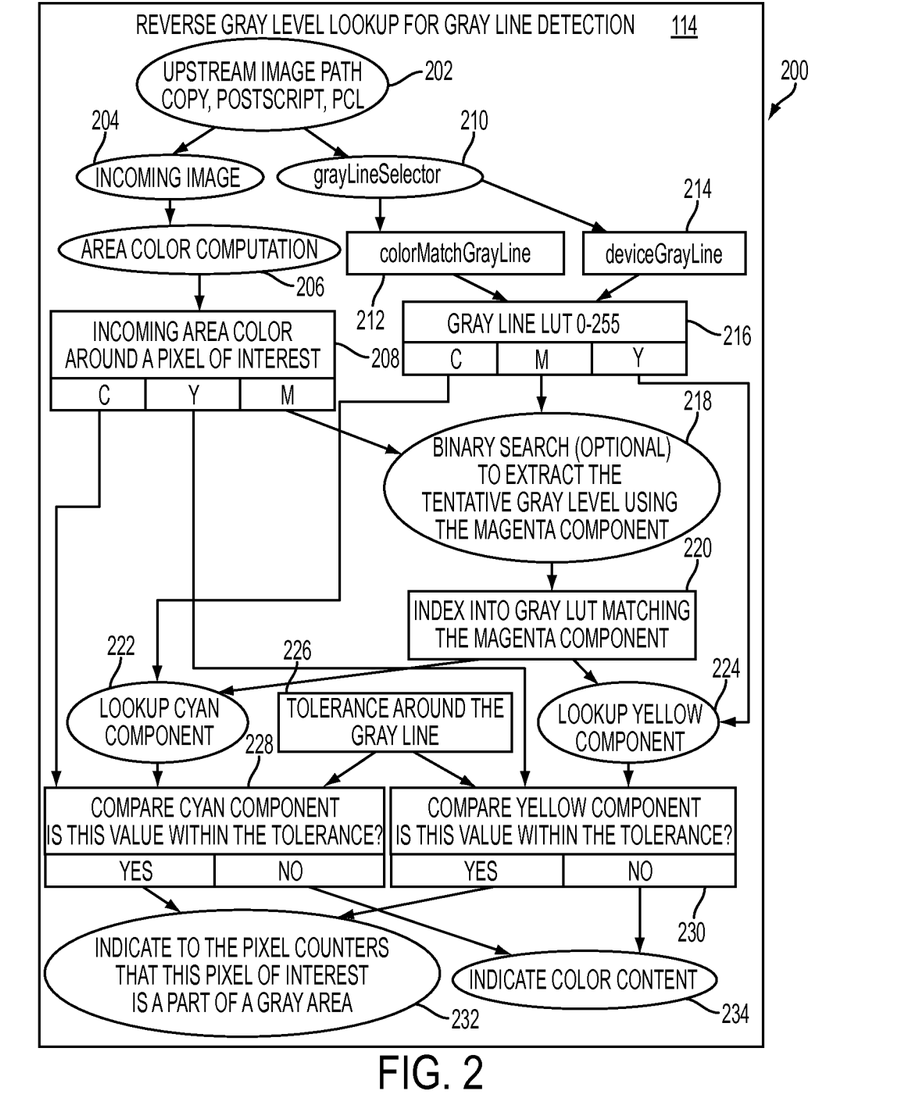
FIG. 2 shows a schematic diagram illustrating determinations made in a method for color pixel counting in documents in accordance with an embodiment of the present disclosure.

FIG. 2 shows a schematic diagram illustrating determinations made in a gray content detection method that is used herein for color pixel counting in documents. The gray content detection steps are performed in the backend image path (e.g., in 112 of FIG. 1) by processing element(s) prior to final processing for marking Because of the composite gray nature of marked image data when using a medium such as solid ink for marking, this method applies a two-dimensional area filter to the image data in order to determine if the marked color pixels (i.e., upon marking) comprise a visibly color area to the human eye, or if the marked color pixels (i.e., upon marking) are a part of a composite gray area. This detected gray condition is then applied to the pixel counters (e.g., 118 in FIG. 1) so as not to count the composite gray pixels as color pixels. Thus, only those pixels that are visibly colorful are counted as color content, and used to determine a billable pixel count.

As shown in FIG. 2, image data of a document comprising a plurality of pixels is received by the system (e.g., system 100 in FIG. 1) upstream in the image path at 202 and, as needed, processed by any front end processing elements. From the upstream image path, the incoming image is then sent at 204 to back end processing elements in the IOT 104 for further processing and output. At least one processor in the IOT 104 is configured to determine a billable count of color pixels in the received image data 204 by determining if color pixels from the received image data are visibly color or composite gray to the human eye upon marking using one or more output color components by processing pixels of interest. More specifically, an area color computation is performed at 206 on pixels of interest in the image data.

Figure 3:
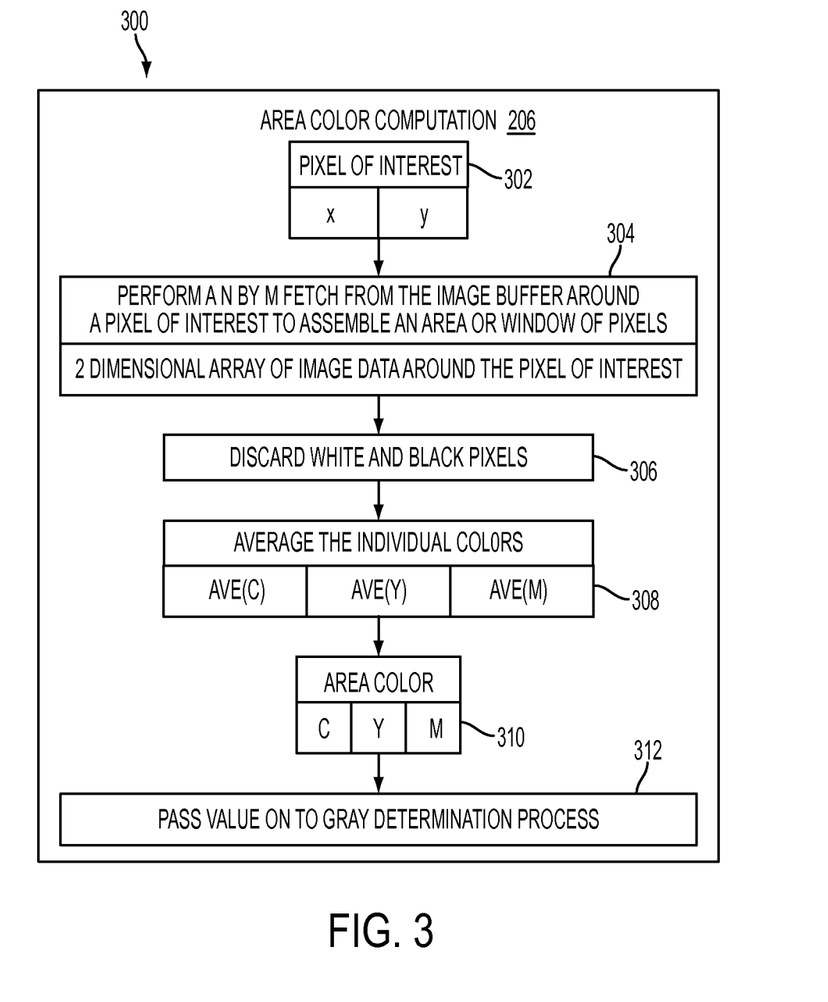
FIG. 3 shows a flow chart/block diagram illustrating an area color computation method for determining color of an area or window around a pixel of interest for use in the method of FIG. 2.

Specifically, FIG. 3 shows a flow chart/block diagram illustrating an area color computation method 300 in accordance with this disclosure for determining color in an area or window around a pixel of interest for use in the method of FIG. 2, noted at 206. For each pixel of interest, as shown at 302, a window or an area in the image data comprising the pixel of interest and neighboring pixels around the pixel of interest is established at 304. The window can be a two-dimensional array of image data used for processing and determining the color components in the area around that pixel of interest, to determine if the pixel is in a color area or a composite gray. In an embodiment, this includes fetching an N×M window (N columns, M rows) from the image buffer for processing. For example, in an embodiment, for each pixel of interest, a 16×16 window (i.e., N=M=16) may be used for processing. However, this is exemplary only and it should be understood that a larger or smaller area, a polygonal area, a non-square area, circular or oval area, or an arbitrary shaped area for integration may be used for processing.

Locations around a pixel of interest within the window or area of interest may have associated with it, for example, a weighting factor that may be applied during the processing to determine if the pixel is in a color or grey area. The weighting factor is a multiplier on pixel value in each location. For example, in an embodiment, locations at edges of the window or area of interest may have significantly lower weighting factors relative to locations closer to the pixel of interest. Locations closer to the pixel of interest may have weighting values slightly lower than or equal to the weighting value on the pixel of interest. However this is exemplary only and it should be understood that the weighting factors may all be equal or may have arbitrary assignments.

Each pixel within the window or area of interest also may carry with it additional information that designates the pixel as an edge or as a part of another section of the image that may exclude the pixel from gray content processing. For example, a fine line of color passing through a gray fill area may be marked for exclusion from the computation (such as the example below) and further processing.

Each of the pixels in the window are processed by performing an area color computation of the pixels in the window, to determine each gray level value (e.g., in the range of a reverse lookup table) for each instance of an output color component in the window. For example, using C, M, and Y as the output color components, for each pixel in the window that has one of C, M, and/or Y, the 8-bit gray level value between 0-255 for each instance of C, M, and/or Y is determined. For instance, as an example, there may be 10 pixels with magenta (M) in the window, and the gray level values of these pixels may be determined to be one of the following values: 150, 175, 165, 180, or 210. Such values are exemplary only and it should be understood that a larger or smaller bit depth may be used for representing the gray level and will affect the overall range of color in each pixel.

In addition to the individual values of each pixel, in an embodiment, the weighting factor from each location within the window of interest can be a multiplier on the value from the corresponding location. Continuing from the above example, the pixel of value 150 at one location may have a weighting factor of 0.5 for that location and the other pixel of value 150 at another location may have a weighting factor of 0.8. The result of the computation may then be scaled to match the full range of the reverse lookup table, or the weighting factors can average one in order to maintain the complete range of the reverse lookup table.

At 306, any pixels that are determined to be white (i.e., no color, e.g., value of 0 (zero)) or black (i.e., K, e.g., value of 255) may be discarded and not used in the counts for area color. The averages of the gray level values for the individual output color components in the window are then determined at 308. That is, an average gray level value of C, an average gray level value of Y, and an average gray level value of M for the pixels in window are determined. For instance, using the exemplary gray level values noted above for M, the average gray level value for M in the window would be 176 (assuming there are two pixels of each value for a total of 10 pixels, i.e., (150*2+175*2+165*2+180*2+210*2)/10=average of 176 for M in the noted window). This value will be used by the steps shown in FIG. 2 (e.g., 218+), for example. Similar averages for C and Y are also determined. Thus, the average gray level values (or area color computation results) of the color components are determined, indicated at 310. These average gray level values are then used by or passed onto the gray determination process at 312, as shown at 208 in FIG. 2.

The simplest form for the determination of the value to look up may be to determine where pixel data at a bit depth matches the gray line LUT so that the value of a single pixel can be used as the value used to perform the reverse gray lookup.

Referring back to FIG. 2, the results of the area color computation are received at 208 and then at least one is used to determine gray line values for the output color components, i.e., determine associated values at which the color components appear visibly gray to the human eye when marked. The average gray level values from the area color computation at 206-208 for at least two output color components are compared to their corresponding gray line values, and the results of the comparison determines that the pixel of interest is either visibly color or composite gray upon marking. FIG. 2 illustrates one exemplary embodiment for the determination of gray line values and comparison of counts and values at 218-234.

In an embodiment, to determine gray line values for the output color components, a gray line value for one of the color components is first obtained using the average gray level value for the window from 208. Based on the gray line value for the one of the color components, the gray line values associated with remaining output color components are determined. In FIG. 2, an example for such determinations is shown. In the illustrated embodiment, described further below, the method steps are performed based on values and features of the magenta (M) component for a pixel of interest.

The gray line values and features are used to find values and features of C and Y. However, it should be noted that any one alternate marking color (C or Y) can be used as an indexing color in order to determine the other two alternate marking colors.

In FIG. 2, a binary search is first performed at 218 to extract the tentative gray line level using the M component. However, binary searching is optional and need not be specifically performed. Alternatively, a reverse look up may be performed to determine if the incoming color is considered on the gray line. Any search method for gray line levels, where the output device gray line is not C=M=Y, may be used. The gray line value for this component can be obtained using one or more look up tables (LUTs). Specifically, the average gray level value from the incoming area color at 208—in this illustrated case, the averaged M component, or 176—is used to search and index the gray line look up table (LUT). The gray line LUT defines values and combinations at which the output colors can be marked to generate composite gray pixels (e.g., out of CMY, CM, MY, etc.) that mimic lightness and hue of pixels that appear visually black (appear as K) to a user. Such values can be used to define the gray line for CMY. At 220, the gray line LUT is indexed to determine gray line values for the C component at 222 and Y component at 224 that are associated with the gray line value of the M component (and result in visual gray).

In an embodiment, the values for the output color components in the gray line LUT at 216 may be based on gray line determinations selected by a user, e.g., a color match gray line shown at 212, for a particular output device, i.e., device gray line, at 214, or both. In an embodiment, the gray line LUT used at 216 is set at a default for the device gray line. In another embodiment, a gray line selector 210 may be provided to alter the values used for the gray line. In another embodiment, the gray line selector 210 may be based on the image data that is received in the image path. That is, a processing element may be configured to determine and alter the LUT based on the received image data. In some cases, an entire page can have one color space intent. Thus, a gray line matching the color space could be specified, i.e., a color match gray line, for use as LUT data.

In one embodiment, a gray line selector could be a user interface (UI) feature associated with the output product or device that enables the customer to explicitly specify what the customer considers to be their color space gray curve from black to white. This could be specified using any of the common UI tools for specifying a line through a color space, including points on a curve with shape controlling handle bars, for example. A color match gray line is defined as the output of the customer selected color space where the color conversion is incremented from black to white with equal amounts of R, G and B or C, M, Y and K, or in L*a*b space where L is incremented but keeping a=b, or any other user specified color space. Press color line is a specific color match so the color match gray line applies. The device gray line is defined as the LUT which gives a neutral color throughout when incremented from black to white. Typically this uses the color of the black ink (K) as a reference color for the LUT, but is not a requirement.

As such, any number of inputs may be used to specified and/or alter the device gray line values that are used at 216.

Once the gray line values are determined for the C and Y components, each of these values are compared to the corresponding average gray level values from the area color computation at 206 to determine if the pixel of interest is visibly color or gray when marked. In an embodiment, the comparison includes determining if the corresponding computed values from 208 are within a predetermined tolerance. A tolerance may be defined around the gray line values for use with the method, as indicated at 226. As shown at 228 and 230, if average gray level values in the window for the at least two output color components (C and Y) from the color area computation are within the predetermined tolerance level for the corresponding gray line values, i.e., both are YES at 228 and 230, then the pixel of interest is determined as visibly gray upon marking at 232. However, if at least one of the comparisons of the average gray level values for the window and gray line values for an output color component is not within the predetermined tolerance level, i.e., if one is NO at 228 or 230, then pixel of interest is determined as visibly color upon marking at 234. If the pixel of interest is determined as visibly color, a count is added to the billable count of color pixels, e.g., color content counter 120 of the pixels counters 118 in system 100. Otherwise, a count is added to a neutral pixel count or a composite gray count, e.g., to a gray content counter 122 of system 100.

After the pixels of interest are processed, then a billing structure for the image data of the document can be determined based on at least the billable count of color pixels, i.e., the count from the color content counter 120. In an embodiment, the billing structure is based on a multi-tiered threshold value, wherein a billing tier is selected from a plurality of tiers at which to bill for marking outputting the received image data.

Accordingly, this method differs from earlier gray and color detection methods in that the composite gray detection is done at the back end of the image path, thereby permitting it to work with both print and copy paths. Many earlier applications used for determining gray and color data are limited solely to either the print path (U.S. Pat. No. 7,755,800, issued Jul. 13, 2010, U.S. patent application Ser. No. 12/246,956, filed on Oct. 7, 2008 and Published as 20100088201 on Apr. 8, 2010, and U.S. Pat. No. 8,117,134, issued Feb. 14, 2012, each of which are assigned to the same assignee of this disclosure (Xerox Corporation) and each being incorporated by reference herein in their entirety) or the copy path (e.g., U.S. patent application Ser. No. 12/962,298, filed Dec. 7, 2010 and Published as 20120143736 on Jun. 7, 2012, assigned to the same assignee of this disclosure, and incorporated by reference herein in its entirety). Also, some earlier methods (e.g., U.S. Pat. No. 7,903,285, issued on Mar. 8, 2011, also assigned to the same assignee of this disclosure and incorporated by reference herein in its entirety) reduce the image data on a per plane basis using counters based on tiles before integrating the color planes for neutral/gray detection. Such methods have limited or reduced accuracy based on tile size and available resources to intermediately store the tiled results. In contrast, the herein disclosed method results in a more accurate pixel count of colors and gray pixels (e.g., for use in tier billing).

In the above method, the billable count of color pixels (also referred to throughout this disclosure as "billable color pixel count" or "billable pixel count") is used to determine the billing structure or select the billing tier for outputting the page. The billing structures used with the image processing apparatus or output device should not be limiting. In an embodiment, it is envisioned that the cost for pages may be determined or based on tiers that are based on threshold values. For example, in an embodiment, the chosen or determined billing structure or tier is based on the number of visible color pixels to be output/marked in device dependent space as compared to a threshold. In another embodiment, the determined billing structure is based on a ratio or percentage of color image data comprising an amount equal to or higher than a percentage threshold.

Figure 4:
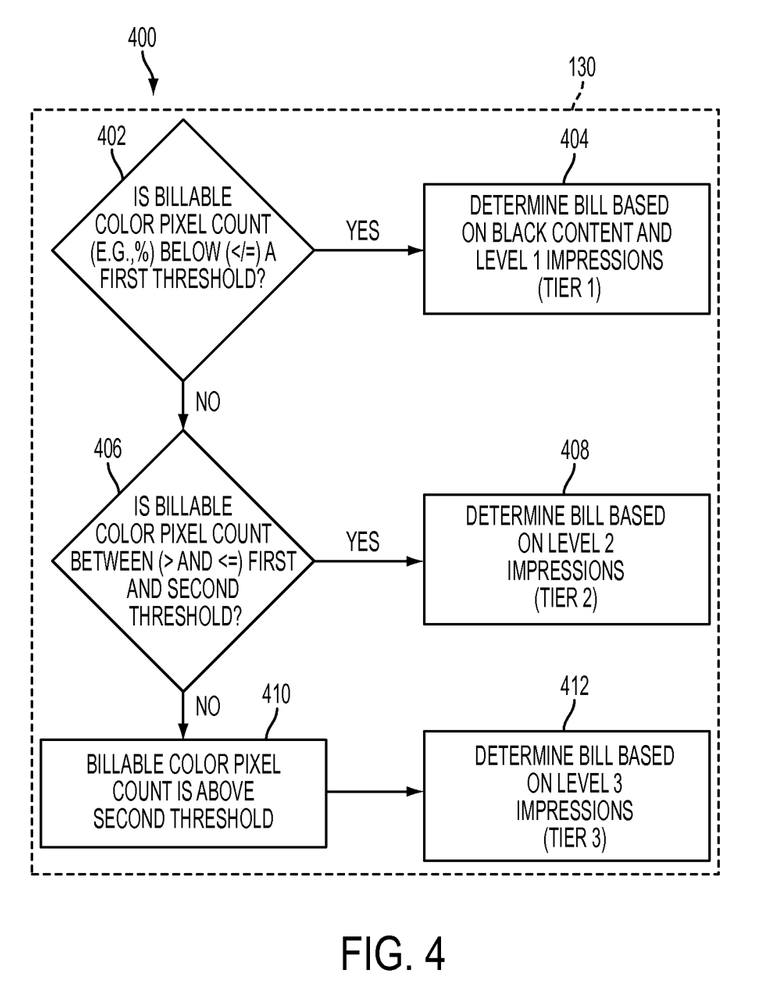
FIG. 4 illustrates an example of a method for determining a billing structure in a 3-tier threshold billing structure.

In another embodiment, the billing structure is based on a multi-tiered threshold value. That is, the billable count of color pixels may be measured or weighed with reference to a total number of pixels in an image. Based on such measurements or weights, the page or document may be billed by choosing a billing structure associated with a tier (e.g., Tier-1, Tier-2, Tier-3) based on the number of satisfied thresholds. That is, one or more thresholds may be used to separate billing tiers which may be used to charge a customer. Such multi-tier bill plans provide options to the customer which better match types of printed documents and workflows. Additionally, two-tier and three-tier meter billing plans may replace black-only and color-only billing structures, which is more satisfactory for the customer and supplier. FIG. 4 and its corresponding description below illustrate a method 400 for determining and/or selecting a billing tier at which to bill for outputting the received image data.

FIG. 4 illustrates an example of a general method for determining a billing structure or tier using a 3-tier threshold structure. For example, the 3-tier color distribution may include: expressive, useful, and everyday color use. In an embodiment, the three tiers may be defined as follows: Tier-1: all black and white documents and documents with a small amount of color are billed at black and white rate; documents with more than a small amount of color but less than a large amount of color are billed at a lower than market color impressions rate (everyday color, level 2 impressions); documents with large amounts of color are bill at a competitive market color impressions rate (expressive color, level 3 impressions). To determine or separate such tiers, breakpoints, percentages, or thresholds may be used. In the illustrated embodiment, the thresholds dividing the tiers may be percentages of color, based on the billable pixel count as compared to a total number of pixels, for example. However, the percentages or thresholds and the methods of defining the percentages or thresholds that are used to determine the tiers (e.g., ratio, percentage, pixel count) should not be limiting.

In any case, FIG. 4 illustrates one process 400 for determining the billing structure or tier at which to bill image data being processed by the processor and/or system of FIG. 1. Using at least the billable count of color pixels determined by the color content count at 120, for example, the billable pixel count for marking and outputting the document is determined. Then, it is determined, as shown at 402, if the billable pixel count is below a first threshold. If yes, the billing structure is determined using a first tier, e.g., Tier-1, based on black/neutral content (or level 1 impressions), as shown at 404. If the billable pixel count is not below a first threshold, i.e., no, but determined to be between the first and a second threshold as shown at 406, the billing structure for the page is determined to be in a second tier, e.g., Tier-2, (based on level 2 impressions), as indicated at 408. If the billable pixel count is not between the first and second thresholds, i.e., no, the coverage is determined to be above the second threshold at 410, and the billing structure for the page is determined based on level 3 impressions of a third tier, e.g., Tier-3, as shown at 412.

In an embodiment, the system 100 shown in FIG. 1 may further comprise one or more separate and distinct processing elements or modules for determining a billing structure and/or a billing cost for outputting an input page or document via an output/marking device. For example, examination and/or calculation elements or modules may be configured to use the counts at 120 and 122 from the pixel counters 118 to determine the billable pixel count of color pixels in the image data. That is, such modules can be used to count color pixels, count billable color pixels, and/or determine a billing structure or tier at which to bill for a document or image being marked for output. Such modules could also implement one or more steps shown in FIG. 2 and/or 3.

In an embodiment, besides the selected billing structure or tier (determined through the back end image processing), the billing cost is further calculated based on a type of output device to be used. For example, when printing to a printer or MFD, the chosen type of output device may alter the cost for printing the page or document due to the plurality of output modes, inks, toners, and other elements which contribute to the quality of the output document. Accordingly, it should be understood that additional calculations may be used for determining billing costs besides the determined billable count of color pixels obtained by this disclosure.

Other embodiments include incorporating the above methods into a set of computer executable instructions readable by a computer and stored on a data carrier or otherwise a computer readable medium, such that the method 200 and/or 300 is automated. In a possible embodiment, the methods may be incorporated into an operative set of processor executable instructions configured for execution by at least one processor. For example, FIG. 3 shows a flow chart of such computer readable instructions. In some embodiments, memory or storage of an output device carrying instructions is configured such that when the executable instructions are executed by a computer or processor, they cause a computer or processor to automatically perform a method for determining color content in documents and/or a billing structure for outputting documents. Such instructions may be contained in a system memory, for example. In alternative embodiments, hard-wired circuitry may be used in place of or in combination with software instructions to implement the disclosure. Thus, embodiments of this disclosure are not limited to any specific combination of hardware circuitry and software. Any type of computer program product or medium may be used for providing instructions, storing data, message packets, or other machine readable information associated with the methods. The computer readable medium, for example, may include non-volatile memory, such as a floppy, ROM, flash memory, disk memory, CD-ROM, and other permanent storage devices useful, for example, for transporting information, such as data and computer instructions. In any case, the medium or product should not be limiting.

In addition, it should be noted that the system/apparatus described herein may include a display or control panel user interface (UI) that allows a customer to read the billing meter. Meter reads may be used for cost-per-copy pricing, for example. Such meter reads can be obtained by accessing the local user interface on the control panel, or, alternatively, by accessing a remote user interface using an Internet or web connection. For example, a simple interface may be provided that enables a customer or supplier to manage, configure, and monitor networked printers and MFDs from a desktop or laptop using an embedded web server. The location and accessibility of the billing meters on the display/control panel interface should not be limiting. For example, a user may scroll through a list of the billing plans that are available directly on the machine, as well as the billing costs associated therewith, or on a computer. In some cases, the billing meters can also be viewed on a usage profile report. Such a report may be printed or electronic. In the case of an electronic report, for example, one may access such information via a network and an appropriate IP address associated with the device. This information may be accessed via a browser. In an embodiment, the device or system updates the usage in real time. Thus, the billing meters that are accessible via a remote location will match the billing meters of the user interface and its displayed counters.

Any of there herein noted method steps that are described and/or shown in the Figures throughout this disclosure may be implemented by a computer or a processor, for example, and are not meant to be limiting. For example, one or more elements or modules as shown in FIG. 1 may implement the herein described methods or steps.

Any of there herein noted method steps that are described and/or shown in the Figures throughout this disclosure may be implemented by digital electronics in the form of an FPGA or ASIC, for example, and are not meant to be limiting. For example, one or more elements or modules as shown in FIG. 1 may implement the herein described methods or steps.

Any of there herein noted method steps that are described and/or shown in the Figures throughout this disclosure may be implemented by a combination of computer or a processor and by digital electronics in the form of an FPGA or ASIC, for example, and are not meant to be limiting. For example, the elements or modules as shown in FIG. 1 may implement the herein described methods or steps.

While the principles of the disclosure have been made clear in the illustrative embodiments set forth above, it will be apparent to those skilled in the art that various modifications may be made to the structure, arrangement, proportion, elements, materials, and components used in the practice of the disclosure.

It will be appreciated that various of the above-disclosed and other features and functions, or alternatives thereof, may be desirably combined into many other different systems/devices or applications. Various presently unforeseen or unanticipated alternatives, modifications, variations, or improvements therein may be subsequently made by those skilled in the art which are also intended to be encompassed by the following claims.

What is claimed is:

1. A processor-implemented method for color pixel counting in documents for billing comprising at least one page of image data using an image processing apparatus, the image processing apparatus comprising at least one processor for processing documents containing image data comprising a plurality of pixels, the method comprising the following acts implemented by the at least one processor:
   receiving image data of a document comprising a plurality of pixels;
   determining a billable count of color pixels in the received image data by determining if color pixels from the received image data are visibly color or composite gray to the human eye upon marking using one or more output color components by processing pixels of interest, and, for each pixel of interest:
   establishing a window in the image data comprising the pixel of interest and neighboring pixels around the pixel of interest;
   performing an area color computation of the window to determine an average gray level value for each output color component for the pixels in the window;
   determining gray line values for the output color components at which they appear visibly gray to the human eye when marked;
   comparing the average gray level value from the area color computation for at least two output color components to corresponding gray line values, and, wherein the comparing determines that the pixel of interest is visibly color or composite gray upon marking.

2. The method according to claim 1, wherein if the pixel of interest is determined as visibly color, adding a count to the billable count of color pixels,
   else, adding a count to a neutral pixel count or a composite gray count.

3. The method according to claim 2, wherein the method further comprises determining a billing structure for the image data of the document based on the billable count of color pixels.

4. The method according to claim 3, wherein the determined billing structure is based on a multi-tiered threshold value, and wherein the determining the billing structure comprises selecting a billing tier at which to bill for outputting the received image data.

5. The method according to claim 1, wherein the comparing comprises using a predetermined tolerance level with the gray line values and determining if average gray level values for the at least two output color components from the color area computation are within the predetermined tolerance level for the corresponding gray line values, and, wherein the pixel of interest is determined as visibly gray upon marking if the comparing of the counts and gray line values for both of the at least two output color components is within the predetermined tolerance level,
   else, the pixel of interest is determined as visibly color upon marking.

6. The method according to claim 1, wherein the output color components are cyan (C), magenta (M), and yellow (Y).

7. The method according to claim 1, wherein the performing the area color computation comprises averaging the gray level values for each instance of each color component associated with each pixel in the window, wherein the determined gray level value for each component that is used for the comparing is based on the average.

8. The method according to claim 1, wherein the determining gray line values for the output color components comprises:
   obtaining a gray line value for one of the color components using the average gray level value for one of the color components, and, based on the gray line value for the one of the color components, determining the gray line values associated with remaining output color components.

9. The method according to claim 8, wherein the obtained and determined gray level values are determined using one or more look up tables (LUTs).

10. The method according to claim 9, wherein a device gray line LUT is used for the obtained and determined gray level values, and wherein the device gray line LUT uses black (K) as a reference color.

11. The method according to claim 1, wherein the gray line values for the output color components being visibly gray are based on gray line determinations that are selected by a user, for a particular output device, or both.

12. The method according to claim 8, wherein the one of the color components is magenta (M); wherein the gray level value for magenta is used to determine the gray line values for cyan (C) and yellow (Y); and wherein the comparing the average gray level values from the area color computation comprises comparing the average gray level values for cyan (C) and yellow (Y) in the window to their determined and corresponding gray line values.

13. A system for color pixel counting in documents for billing comprising at least one page of image data using an image processing apparatus, the system comprising:

at least one processor comprising an input and an output associated with the image processing apparatus for processing the pixels of the image data, wherein the at least one processor is configured to:

receive image data of a document comprising a plurality of pixels;

determine a billable count of color pixels in the received image data by determining if color pixels from the received image data are visibly color or composite gray to the human eye upon marking using one or more output color components by processing pixels of interest, and, for each pixel of interest:

establish a window in the image data comprising the pixel of interest and neighboring pixels around the pixel of interest;

perform an area color computation of the window to determine average gray level values for each output color component for the pixels in the window;

determine gray line values for the output color components at which they appear visibly gray to the human eye when marked;

compare the average gray level values from the area color computation for at least two output color components to the corresponding gray line values, and, wherein the comparison determines that the pixel of interest is visibly color or composite gray upon marking.

14. The system according to claim 13, wherein, after the processing of the image data using the windows, the at least one processor is further configured to determine a billing structure for the image data of the document based on the billable count of color pixels.

15. The system according to claim 13, wherein the determined billing structure is based on a multi-tiered threshold value, and wherein the determination of the billing structure comprises selection of a billing tier at which to bill for outputting the received image data.

16. The system according to claim 13, further comprising an input device for inputting the document containing image data received by the processor, wherein the input device is selected from the group consisting of: an image input terminal, a scanner, a copier, a facsimile, a memory device, or a storage device.

17. The system according to claim 13, further comprising an output device for marking and outputting the document associated with the image processing apparatus, and wherein the output device is selected from the group consisting of: an image output terminal, a display, a printing device, a copying device, or a multi-function device.

18. The system according to claim 13, wherein the output color components are cyan (C), magenta (M), and yellow (Y).

19. A non-transitory computer readable medium comprising instructions that, when executed by a computer, directs a computer to perform a method for color pixel counting in documents for billing using an image processing apparatus, the method comprising:

determining a billable count of color pixels in image data of a document by determining if color pixels from the image data are visibly color or composite gray to the human eye upon marking using one or more output color components by processing pixels of interest, and, for each pixel of interest:

establishing a window in the image data comprising the pixel of interest and neighboring pixels around the pixel of interest;

performing an area color computation of the window to determine average gray level values for each output color component for the pixels in the window;

determining gray line values for the output color components at which they appear visibly gray to the human eye when marked;

comparing the average gray level values from the area color computation for at least two output color components to the corresponding gray line values, and, wherein the comparing determines that the pixel of interest is visibly color or composite gray upon marking.

20. The medium according to claim 19, wherein if the pixel of interest is determined as visibly color, the method performed by the computer further comprises:

adding a count to the billable count of color pixels, else, adding a count to a neutral pixel count or a composite gray count.

21. The medium according to claim 20, wherein the method performed by the computer further comprises determining a billing structure for the image data of the document based on the billable count of color pixels.

22. The medium according to claim 19, wherein the determining gray line values for the output color components comprises:

obtaining a gray line value for one of the color components using the average gray level value for one of the color components, and, based on the gray line value for the one of the color components, determining the gray line values associated with remaining output color components.

23. The medium according to claim 22, wherein the obtained and determined gray line values are determined using one or more look up tables (LUTs).

24. The medium according to claim 23, wherein a device gray line LUT is used for the obtained and determined gray level values, and wherein the device gray line LUT uses black (K) as a reference color.

25. The medium according to claim 22, wherein the one of the color components is magenta (M); wherein the gray line value for magenta is used to determine the gray line values for cyan (C) and yellow (Y); and wherein the comparing the counts from the area color computation comprises comparing the average gray level values for cyan (C) and yellow (Y) to their determined and corresponding gray line values.

* * * * *